Feb. 17, 1931. W. BREWITT 1,793,047
MOLD FOR ALUMINOTHERMIC WELDING
Filed Nov. 24, 1928   2 Sheets-Sheet 1
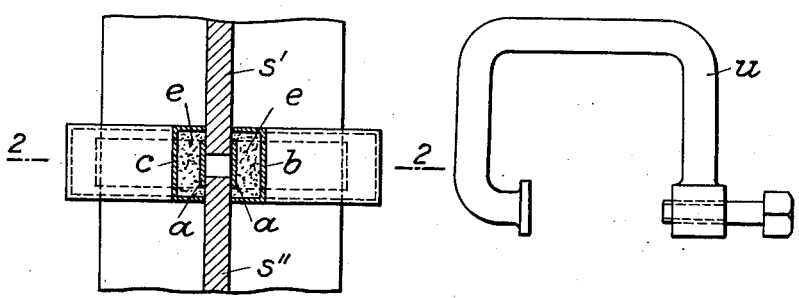
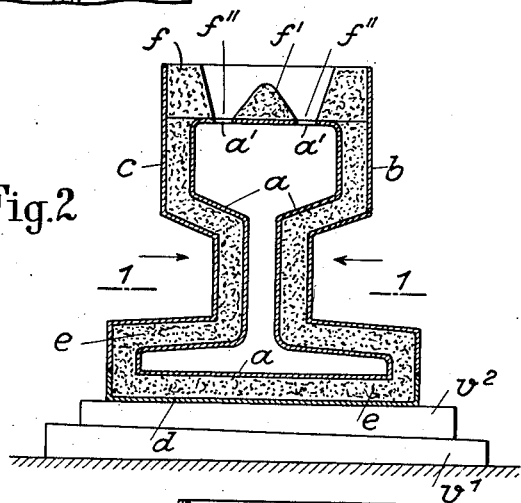
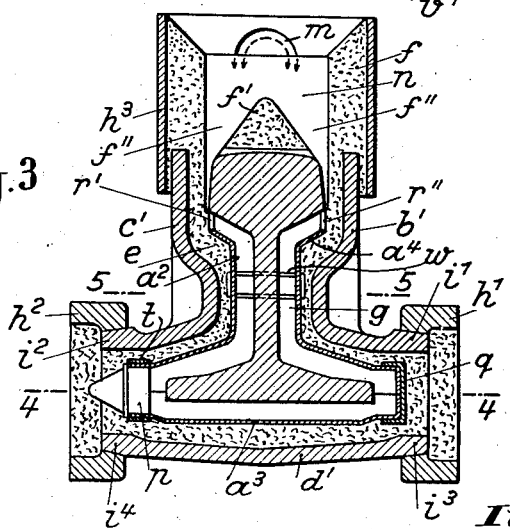
Inventor:
Walter Brewitt,
by Emery, Booth, Janney & Varney,
Attys.

Feb. 17, 1931.  W. BREWITT  1,793,047
MOLD FOR ALUMINOTHERMIC WELDING
Filed Nov. 24, 1928  2 Sheets-Sheet 2
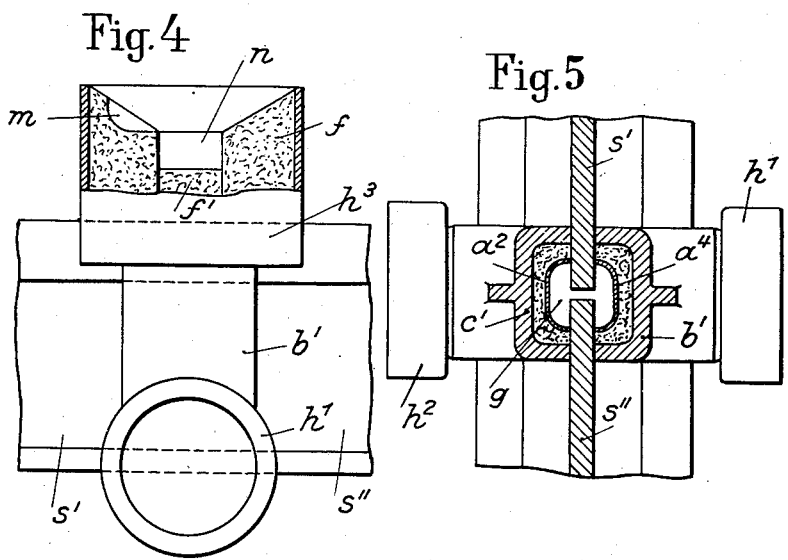
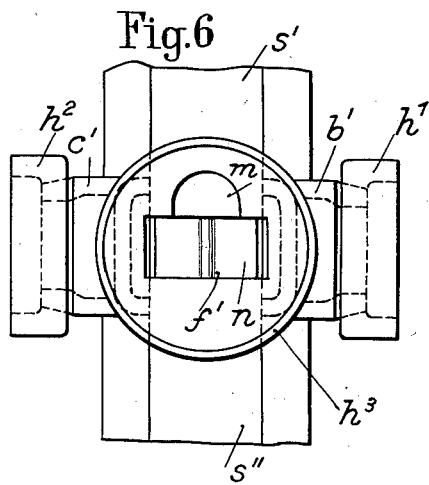

Patented Feb. 17, 1931

1,793,047

UNITED STATES PATENT OFFICE

WALTER BREWITT, OF COPENICK, GERMANY

MOLD FOR ALUMINOTHERMIC WELDING

Application filed November 24, 1928, Serial No. 321,741, and in Germany November 29, 1927.

My invention relates to improvements in molds for alumino-thermic welding.

The known molds for welding rails or other objects by means of liquid iron produced in an alumino-thermic manner were hitherto constructed by tamping foundry sand around a pattern which corresponded with the desired casting cavity. After the mold thus produced has been dried, it is placed around the ends of the rails or other work and fixed, whereupon the liquid iron may be poured into the mold, preferably after the ends of the rails and the mold have been heated by hot gases passed through the cavity of the mold.

According to my invention, the casting cavity may be produced without a tamped sand mold. This presents the possibility that unbreakable molds of iron or other metal may be employed and that practically all parts of the mold can be used repeatedly.

My improved mold substantially consists of an inner single strip of sheet iron or another suitable metal or of such a strip composed of a plurality of parts surrounding the gap between the ends to be welded of the rails or other pieces at the bottom and at both sides thereof, and of outer concave or shell-like parts of iron or another suitable metal, the cavities of which are lined with a plastic refractory material, and which are adapted to be pressed against the work to be welded at the bottom and at both sides thereof above the iron strip. The space confined by the sheet-iron strip or strips and the ends of the rails or other work is then the cavity into which the alumino-thermic metal can be poured. The sheet-iron strip consisting of one or more parts may be given a cross-section bulging outwards, so that on pouring the liquid metal into the mold, the well known cast beading is formed around the welded joint.

Further features and advantages of my improved mold will appear as the description proceeds.

Two embodiments of my invention are illustrated by way of example in the drawings affixed hereto and forming part of my specification. My invention is shown as applied to the alumino-thermic welding of rails.

In the drawings is:

Fig. 1, a longitudinal horizontal section along line 1—1 of Fig. 2,

Fig. 2, a vertical cross-section along line 2—2 of Fig. 1,

Fig. 2a, a side elevation of a screw clamp serving for pressing the parts of the outer shell of the mold against the joint, on a smaller scale, Fig. 3, a cross-section through a modification of my improved mold, Fig. 4, a side-elevation of Fig. 3, the portion of the mold located above the rail heads being shown in longitudinal section, Fig. 5, a horizontal cross-section along line 5—5 of Fig. 3, and Fig. 6, a plan view of Fig. 3.

Like parts are indicated by like letters of reference throughout all the figures of the drawings.

Referring to Figs. 1 and 2 of the drawings, it will be seen that around the gap between the two rails $S'$ and $S''$, which are to be welded together by pouring liquid metal alumino-thermically produced in well known manner into the gap between them, there is placed a strip $a$ of sheet iron or other suitable material. If, for instance, the gap has a width of about ⅜ of an inch, the sheet-iron strip may have a width of about ¾ of an inch. Below the foot of the rail and at both sides of the rails, U-shaped parts $d$, $b$ and $c$ of iron or other suitable material are pressed against the rails. For pressing the side parts $b$ and $c$ against the rails, a screw clamp $u$ of the kind illustrated in Fig. 2a may be used, for instance, which is applied in such a manner that it presses against the side parts $b$ and $c$ in the direction of the arrows in Fig. 2. The forcing of the bottom piece $d$ may be effected by driving in wedges $v^1$, $v^2$. At a width of the gap of about ⅜ of an inch, the parts $b$, $c$, $d$ may have a width of about 1⅛ of an inch. These latter parts are lined with a refractory plastic packing material $e$, such as asbestos or fire clay, in any suitable manner, so that the sheet-iron strip $a$ is embedded in the mass $e$, when the side and bottom parts $b$, $c$, $d$ are forced against the rails. The mass $e$ thus seals the sheet-iron strip and the limbs of the parts $b$, $c$, $d$ against the faces of the rails in a simple and efficient manner and forms a fire proof enclosure or cavity confined by the rail ends and the sheet-iron strip, into which the hot liquid iron is poured in the customary or any suitable manner.

In the case illustrated, a pouring head $f$ is employed which is provided with an upwards tapering or saddle-shaped central piece $f'$, so that two passage openings $f''$ are formed below which the sheet-iron strip $a$ is provided with corresponding outlets $a'$. The stream of liquid metal encountering the saddle $f'$ is thus subdivided and flows through the passage openings $f''$, $a'$ into the cavity of the mold. One advantage of this arrangement is that the two streams of liquid metal formed by the saddle $f'$ do not flow laterally in by-pass channels past the rail head downward as heretofore, but enter directly between the faces of the rail ends and thereby effect a direct and intense heating of these end faces.

The rail joint with the enclosing mold is preferably strongly heated prior to pouring in the liquid metal, in any known manner, for instance by means of heated gases delivered by a suitable blower.

The parts $b$, $c$, $d$ and the packing material may be used repeatedly. The strip iron $a$ must be renewed after each casting.

In the modification according to Figs. 3 to 6 of the drawings, the gap below and at both sides of the rail ends is likewise enclosed by strip iron or tape of sheet iron. In this case, the strip iron consists, for instance, of three parts $a^2$, $a^3$, $a^4$ which abut in the center line 4—4 and are held together by suitable covers, rings or the like, while the side portions $a^2$, $a^4$ are tied together by a wire $w$ passing through suitable holes of the side portions and through the gap. The strip iron is according to Fig. 5 arched outwards, so that around the main cavity special channels $g$ are formed, which are filled up by the metal, and form a reinforcing beading around the casting proper. The strips $a^2$ and $a^4$ are recessed at $r'$ and $r''$ to allow the liquid iron to pass.

The outer shell of the mold consists of two side portions $b'$, $c'$ and a bottom portion $d'$, which have the shape of molds and are pressed against the rails. The adjacent portions of the bottom piece $d'$ and of the side pieces $b'$, $c'$ as well as the opposite upper ends of the side pieces $b'$ and $c'$ are so designed that they may be joined to each other suitably by locking members. This is, for instance, effected in a simple and reliable manner by annular locking members $h^1$, $h^2$, $h^3$. For this purpose, the side parts $b'$ and $c'$ are provided with semi-cylindrical tubular extensions $i^1$ and $i^2$, and the bottom piece $d'$ is in a similar manner at its both ends developed as semi-cylindrical sleeves $i^3$ and $i^4$.

For the purpose of applying and uniting the three parts $b'$, $c'$ and $d'$ of the shell, they are fixed according to Fig. 3 of the drawings. Over the semi-cylindrical sleeves $i^1$ and $i^3$, and $i^2$ and $i^4$ belonging together are then placed rings $h^1$ and $h^2$. The cooperating surfaces of the sleeve-like extensions and of the rings are preferably made tapering. Over the opposite upper ends of the two side parts $b'$ and $c'$ is then placed a ring $h^3$. This ring $h^3$ is so dimensioned that it forces the side portions $b'$ and $c'$ against the sides of the rail and simultaneously firmly presses the extensions $i^1$ and $i^2$ in the rings $h^1$ and $h^2$. It will be understood, however, that the shell portions of the mold may be constructed in a different manner and be subdivided in a different number of parts. The cross-section and the shape of the closing members $h^1$, $h^2$ and $h^3$ may likewise be modified in various ways, for instance oval, rectangular, single or composed of a plurality of parts. They are preferably so designed that they will contract and hold together the parts of the shell of the mold by means of a wedge, screw or similar action.

The outer shell portions $b'$, $c'$ and $d'$ are lined with a refractory packing material $e$, as in the first described embodiment. This material is soft and plastic when the shell portions are applied to the welding place, so that it will force the iron strip $a^2$, $a^3$, $a^4$ against the faces of the rails and seal it efficiently, when the parts $b'$, $c'$ and $d'$ are forced against the rails. The excess of packing material is squeezed out through the open ring joints and between the limbs of the parts $b'$, $c'$, $d'$ and the rails, so that it will also reliably seal these places towards the outside.

Prior to pouring the liquid metal into the mold, the latter is heated externally or internally, so that the refractory material will become rigid and dry. The annular joints $h^1$ or $h^2$ or both of them may serve for injecting hot gases for the preheating of the rail ends and the mold. For this purpose, the connection of the two sheet iron pieces is in Fig. 3 on the left-hand side effected by an open ring $t$. After the preheating is finished, this opening is closed by a suitable plug $p$. On the right-hand side of the Figure 3, a cap $q$ serves as a connecting member from the very beginning. If it is desired to preheat on this side, the joint is produced in the same manner as on the left-hand side. Both openings in the rings $h^1$ and $h^2$ are closed by sand or clay. The opening in the ring used for preheating is of course not closed until preheating is finished.

In the ring $h^3$, a pouring head $f$ with saddle $f^1$ and two lateral gates $f''$ is produced in the customary manner, for instance by tamping or ramming. The edge of the pouring head $f$ is, however, provided with a cavity or other suitable recess $m$, the symmetrical central axis of which is located in the same vertical plane as the crest axis of the saddle $f'$. The liquid metal is not directly poured into the pouring opening $n$ proper, but upon or into the said trough-shaped recess $m$. Consequently, the liquid iron will then slide as indicated in Fig. 3 by the small arrows along the two suitably rounded guide faces of the trough $m$ and spread out in the manner of a fan over the edge of the trough onto the bridge member $f'$. By suitably shaping the overflow place $m$, a uniform distribution of the iron is thus ensured on both sides of the bridge member $f'$ and consequently a uniform run of the iron on both sides of the bridge member $f'$.

My invention is equally suitable for welding grooved rails.

Various changes and modifications may be made without departing from the spirit of my invention and the appended claims, and I desire, therefore, that only such limitations should be placed upon it as are imposed by the prior art.

I claim as my invention:—

1. A mold for alumino-thermic welding, having in combination, a strip of sheet iron located around the joint below and at both sides of the work to be welded, external shell members lined with a plastic refractory packing material and adapted to be pressed against the sides and the bottom of the work and to force the said sheet iron strip closely against the circumference of the work, and means for pressing the external shell members against the sides and the bottom of the work.

2. A mold for alumino-thermic welding, having in combination, a strip of sheet metal composed of a plurality of parts of arch-shaped cross-section located around the joint below and at both sides of the work to be welded, external shell sections lined with a refractory plastic packing material and adapted to be pressed against the sides and the bottom of the work and to force the parts of the sheet iron strip closely against the circumference of the work, and means for forcing the external shell sections against the sides and the bottom of the work.

3. A mold for alumino-thermic welding, having in combination, a separable mold casing comprising two lateral shell portions and one lower shell portion provided with refractory linings and adapted to fit the sides and the base of the work, means for forcing said shell portions against the work, and a pouring head located in the top opening of said mold and consisting of a central ridge member and two lateral inlet openings, said two lateral shell portions being arranged and adapted to contact sideways against the upper portion of the work.

4. A mold for alumino-thermic welding, having in combination, a separable mold casing comprising a plurality of shell portions with refractory linings adapted to be assembled to form a mold casing fitting the base and the sides of the work, means for forcing said shell portions against the work, and a pouring head in the upper opening of said mold and consisting of a central ridge member and two lateral inlet openings, the upper edge of said pouring head being at a place diametrically opposite the ridge axis of said ridge member and being so formed that the liquid iron encountering said place is distributed uniformly to both sides of said ridge member.

5. A mold for alumino-thermic welding, having in combination, a plurality of shell portions with refractory linings adapted to be assembled to form a mold casing fitting the base and the sides of the work, means for forcing said shell portions against the work, and a pouring head in the upper opening of said mold and consisting of a central ridge member and two lateral inlet openings, the upper edge of said pouring head being provided with a trough-shaped recess the symmetrical axis of which is located in the same vertical plane as the ridge axis of said ridge member and being so shaped that the liquid iron impinging upon said recess is uniformly distributed over both sides of said ridge member.

6. A mold for alumino-thermic welding having, in combination, a strip or sheet iron located around the joint below and at both sides of the work to be welded, two lateral shell sections and a bottom shell section of trough-like cross-section surrounding said strip in spaced relation thereto, a packing of plastic refractory material between said shell sections and strip, the end portions of the bottom section and the adjacent end portions of the two lateral sections as well as the adjacent upper end portions of the said lateral sections being shaped and adapted to be connected with each other, and locking members adapted to be secured upon and to connect said adjacent end portions of the said bottom and lateral shell sections.

7. A mold for alumino-thermic welding having, in combination, a strip of sheet iron located around the joint below and at both sides of the work to be welded, two lateral shell sections and a bottom shell section of trough-like cross-section surrounding said strip in spaced relation thereto, a packing of plastic refractory material between said shell sections and strip, the end portions of the bottom section and the adjacent end portions of the two lateral sections being formed with semi-cylindrical sleeve-like extensions, and annular locking members adapted to be secured upon the said adjacent sleeve-like extensions of the bottom section and the two lateral sections as well as upon the upper opposite end portions of the two lateral shell sections.

In testimony whereof I have affixed my signature.

WALTER BREWITT.